(12) United States Patent
Yi et al.

(10) Patent No.: US 9,537,992 B2
(45) Date of Patent: Jan. 3, 2017

(54) MOBILE PHONE DOCKING DEVICE OF INSIDE MIRROR

(71) Applicants: Hyundai Motor Company, Seoul (KR); Kia Motors Corporation, Seoul (KR)

(72) Inventors: Ki Chang Yi, Busan (KR); Joong Chul Ahn, Seoul (KR); Young Wook Song, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/925,587

(22) Filed: Oct. 28, 2015

(65) Prior Publication Data

US 2016/0191687 A1    Jun. 30, 2016

(30) Foreign Application Priority Data

Dec. 31, 2014  (KR) .................. 10-2014-0194954

(51) Int. Cl.
| | |
|---|---|
| *H04M 1/00* | (2006.01) |
| *H04M 1/60* | (2006.01) |
| *G06F 1/16* | (2006.01) |
| *H04B 1/3877* | (2015.01) |
| *H04M 1/04* | (2006.01) |
| *B60R 1/12* | (2006.01) |

(Continued)

(52) U.S. Cl.
CPC ............. *H04M 1/6075* (2013.01); *B60R 1/12* (2013.01); *B60R 11/02* (2013.01); *G06F 1/1632* (2013.01); *H04B 1/3877* (2013.01); *H04M 1/04* (2013.01); *B60R 2001/1284* (2013.01); *B60R 2001/1292* (2013.01); *B60R 2011/0033* (2013.01); *H04M 2250/12* (2013.01)

(58) Field of Classification Search
CPC .. H04M 1/6075; H04M 1/04; H04M 2250/12; B60R 11/02; B60R 1/12; B60R 2001/1284; B60R 2001/1292; B60R 11/0033; G06F 1/1632; H04B 1/3877
USPC ............ 455/469.1, 469.2, 575.1, 90.3, 575.3
See application file for complete search history.

(56) References Cited

U.S. PATENT DOCUMENTS

| | | | |
|---|---|---|---|
| 2002/0082058 A1* | 6/2002 | Baratono | B60R 1/12 455/569.2 |
| 2007/0133112 A1* | 6/2007 | Chia | B60R 1/12 359/871 |

(Continued)

FOREIGN PATENT DOCUMENTS

| | | |
|---|---|---|
| DE | 102010015289 A1 | 10/2011 |
| JP | 2007-112200 A | 5/2007 |

(Continued)

*Primary Examiner* — Shahriar Behnamian
(74) *Attorney, Agent, or Firm* — McDermott Will & Emery LLP

(57) ABSTRACT

A mobile phone docking device of an inside mirror includes a mirror base having a mirror formed on a front surface thereof. A phone holder includes a holder base and a phone gripper configured to extend from two opposing sides of the holder base to grip the mobile phone. The holder base is configured to hold and support the mobile phone gripped by the phone gripper. A joint unit connects the mirror base and the phone holder and is configured to pivotably support the phone holder on the mirror base, The phone holder is configured to hold the mobile phone at a rear side of the mirror.

12 Claims, 13 Drawing Sheets

HOLDING COMPLETION - SMART DOCKING

(51) Int. Cl.
*B60R 11/02* (2006.01)
*B60R 11/00* (2006.01)

(56) References Cited

U.S. PATENT DOCUMENTS

| | | | |
|---|---|---|---|
| 2009/0052071 A1* | 2/2009 | Chang | B60R 1/12 |
| | | | 359/839 |
| 2011/0112763 A1* | 5/2011 | Pu | B60R 1/12 |
| | | | 701/431 |
| 2012/0315845 A1 | 12/2012 | Buczek | |
| 2013/0292296 A1 | 11/2013 | Kang et al. | |
| 2014/0162733 A1* | 6/2014 | Cole | G06F 1/1607 |
| | | | 455/575.1 |
| 2014/0354881 A1 | 12/2014 | Liao | |

FOREIGN PATENT DOCUMENTS

| KR | 10-2009-0075379 A | 7/2009 |
|---|---|---|
| KR | 10-2010-0006915 A | 1/2010 |
| KR | 10-2010-0123435 A | 11/2010 |
| KR | 10-2011-0045725 A | 5/2011 |
| KR | 10-2011-0058120 A | 6/2011 |
| KR | 10-2012-0138556 A | 12/2012 |
| KR | 10-2012-0138564 A | 12/2012 |
| KR | 20-2013-0001512 U | 3/2013 |
| KR | 10-2013-0123103 A | 11/2013 |

* cited by examiner

BASIC STATE – SMART PHONE IS NOT HELD

PREPARATION FOR HOLDING – MOVE TO HOLDING UNIT

PREPARATION FOR HOLDING - OPENING SMART PHONE GRIPPING UNIT

HOLDING COMPLETION - SMART DOCKING

MOBILE PHONE DOCKING DEVICE OF INSIDE MIRROR

CROSS-REFERENCE TO RELATED APPLICATION

This application claims under 35 U.S.C. §119(a) the benefit of priority to Korean Patent Application No. 10-2014-0194954 filed on Dec. 31, 2014, the entire contents of which are incorporated herein by reference.

TECHNICAL FIELD

The present invention relates to a mobile phone docking device of an inside mirror which can hold and dock a mobile phone to a rear side of an inside mirror.

BACKGROUND

In recent years, with an increase in rate of supply of a mobile phone such as a smart phone, various applications have been developed and numerous applications related with a vehicle, such as a navigation, a car keeping book, a black box, and the like have also been developed and used. In particular, vehicle related applications have been developed, such as a lane departure warning system (LDWS) or a front collision warning (FCW) system using a camera and various sensors of the smart phone and reliability thereof has also been improved.

However, a separate smart phone cradle is purchased and mounted on a front side of an interior of the vehicle in order to use the vehicle related applications and the smart phone cradle in the related art is mounted, for example, with being hung on a lower side of an inside mirror, and as a result, the smart phone is held with a front surface (screen) of the smart phone being exposed. Therefore, a front view of a driver is interfered and a passenger is wounded by removal from a vehicle body when a vehicle accident occurs and further, the smart phone comes into the view of the driver who is driving to cause the driver to watch a motion picture and use other applications, thereby dispersing the attention of the driver.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to solve the above-described problems associated with prior art.

Embodiments of the present invention has been made in an effort to provide a mobile phone docking device of an inside mirror which can secure a driving view and secure a camera image view of a mobile phone by enabling a holding portion of the mobile device of which an angle is controllable independently from a mirror while a space and a structure in which the mobile phone can be held in a rear side of the mirror and further, can automatically execute a safe driving auxiliary function by using a predetermined application, and a camera and a sensor of the mobile phone held on the rear side of the mirror.

In one aspect, the present invention provides a mobile phone docking device of an inside mirror capable of holding a mobile phone, including: a mirror base having a mirror formed on a front surface thereof; and a phone holder having a phone gripper including a holder base and a phone gripper configured to extend from two opposing sides of the holder base to grip the mobile phone. The holder base is configured to hold and support the mobile phone gripped by the phone gripper A joint unit connects the mirror base and the phone holder to pivotably support the phone holder on the mirror base. The phone holder is configured to hold the mobile phone at to a rear side of the mirror.

In an embodiment, the phone holder may include a magnetic field generation member embedded at one side thereof. The magnetic field generation member may be capable of generating a magnetic field, and the mobile phone may automatically execute a preset application upon detecting a magnetic field greater than or equal to a first reference value.

In another embodiment, the mobile phone may automatically end the preset application upon detecting a magnetic field less than a second reference value while the predetermined application is executed.

In still another embodiment, the mobile phone may automatically execute a preset application when the mobile phone is held in the phone holder and may automatically end the preset application when the mobile phone is removed from the phone holder while the predetermined application is executed.

In yet another embodiment, a camera hole may be formed at one side of the holder base, an iris for opening/closing may be formed in the phone gripper and the iris may open the camera hole when the phone gripper is opened and extends to both upper and lower sides of the holder base and the mobile phone is thus inserted into the phone gripper.

In still yet another embodiment, a penetration area having predetermined penetration rate may be formed at one side of the mirror, and a screen of the mobile phone seated in the phone holder may be visually verified through the penetration area.

In a further embodiment, a controller wirelessly connected with the mobile phone held in the phone holder may be mounted inside the mirror base, and the controller may be wiredly connected to a plurality of function buttons provided in a mirror bezel formed at an edge of the mirror to transmit an actuation signal of each function button to the mobile phone, thereby allowing the mobile phone receiving the signal to execute or end an application.

In another further embodiment, the joint unit may include a hinge housing coupled to one side of the mirror base, a ball housing coupled to one side of the holder base, and a connecting rod having opposing first and second ends, The first end of the connecting rod may have a hinge connected to the hinge housing, and the second end may have a ball unit connected to the ball housing. The hinge may be assembled between the hinge housing and the mirror base to be axially rotatable and the ball unit may be assembled between the ball housing and the holder base to be rotatable in a front direction, and as a result, the phone holder may be rotatable in the front direction while axially rotating based on the mirror base.

In still another further embodiment, in the phone holder, a push button may be mounted at one side of the holder base supporting a rear surface of the mobile phone and the phone gripper may be opened and extended to both sides of the holder base by interlocking with an operation of the push button.

In yet another further embodiment, the phone holder may include the push button mounted at one side of the holder base, a push gear unit attached to a rear end of the push button, first and second rotational gear units interlocked with the push gear unit and configured to rotate in opposite directions to each other, and a first linear gear unit that protrudes from a bottom surface of an upper gripper portion of the phone gripper. The first linear gear unit may be interlocked with the first rotational gear unit and may be configured to move linearly in an upper or lower direction due to movement of the first rotational gear unit. A second linear gear unit may protrude from a top surface of a lower gripper portion of the phone gripper. The second linear gear unit may be interlocked with the second rotational gear unit and may be configured to move linearly in an opposite direction to the first linear gear unit due to movement of the second rotational gear unit. The phone gripper may be opened to extend from both sides of the holder base by an operation of the push button.

In still yet another further embodiment, the phone holder may include a push button mounted at one side of the holder base, a latch unit provided at the rear end of the push button to unlock an extension portion of the phone gripper so as to open the phone gripper to both sides of the holder base when the push button is actuated. An extension means may be mounted between the holder base and the phone gripper to open the phone gripper to both sides of the holder base at the time of unlocking the latch unit.

The mobile phone docking device of the inside mirror according to embodiments of the present invention provides the following advantages.

1. A structure which can hold a mobile phone in a rear side of a mirror of the inside mirror may be formed to secure a front view of a driver.

2. The mobile phone may be held in the rear side of the mirror and simultaneously, a predetermined application of a predetermined mobile phone is automatically executed to implement a driving auxiliary function, thereby contributing to safety driving and securing driving safety.

3. Only a part of a screen of the mobile phone can be viewed through the mirror to prevent driver's attention from being dispersed due to watching a motion picture or executing the application.

4. Without mounting a system for providing a high-price vehicle safety specification, a function corresponding thereto can be performed by using the mobile phone to acquire an effect of saving cost.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
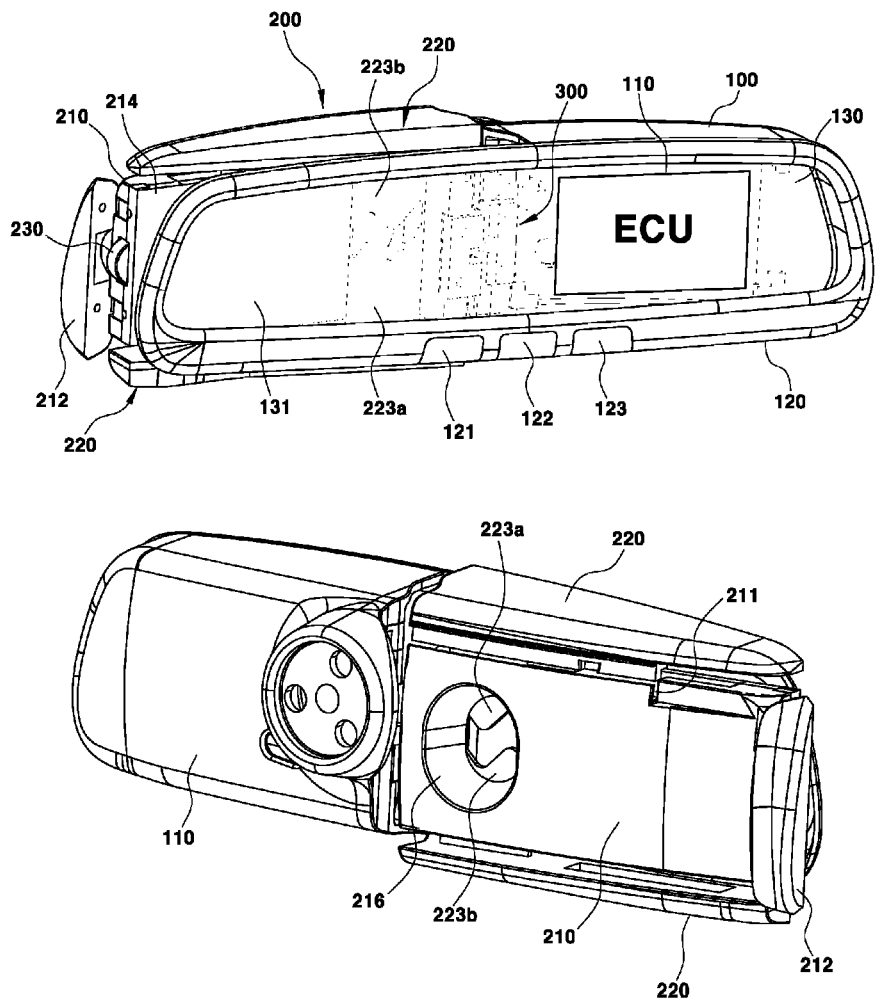
FIG. 1 is a combination perspective view illustrating a mobile phone device of an inside mirror according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings, so as to be easily implemented by those skilled in the art.

Figure 2:
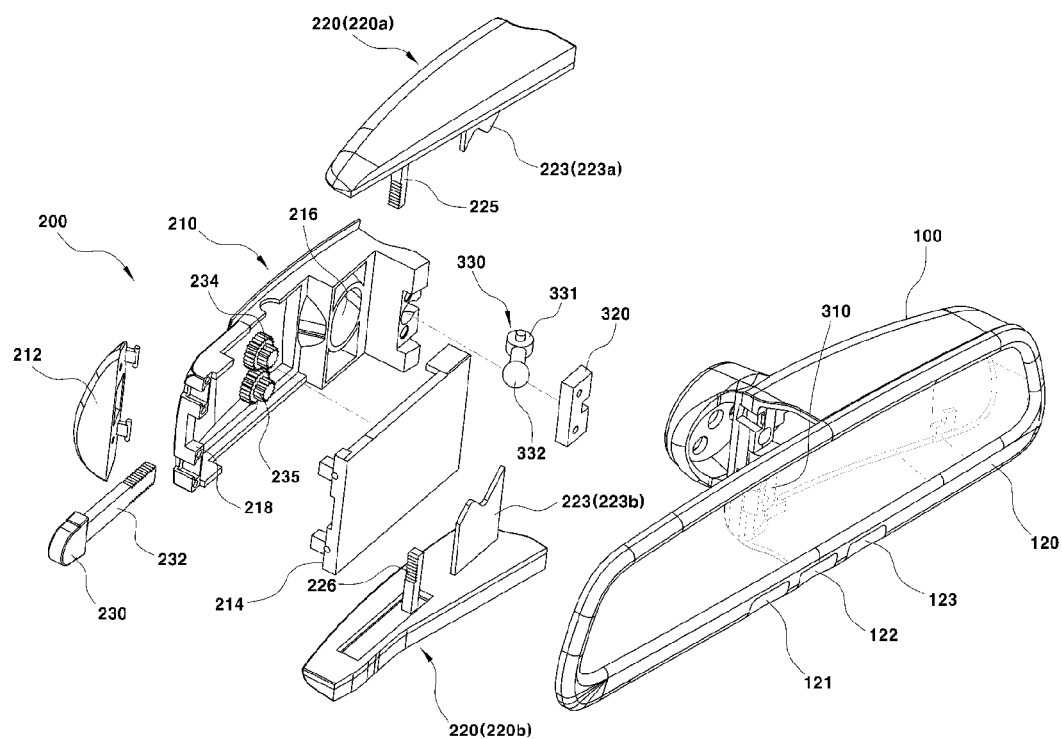
FIG. 2 is an exploded perspective view illustrating the mobile phone docking device of the inside mirror according to the exemplary embodiment of the present invention.

As illustrated in FIGS. 1 and 2, a mobile phone docking device of an inside mirror according to an exemplary embodiment of the present invention is configured to include a mirror base 100 and a phone holder (terminal holder) 200, and a joint unit 300 mounted between the mirror base 100 and the phone holder 200.

In certain embodiments, the mirror base 100 is formed to have an internal space capable of incorporating components such as a controller (ECU) 110, and the like and is mirror 130 surrounded by a mirror bezel 120 is mounted on a front surface.

In certain embodiments, the mirror bezel 120 is formed to extend from the front surface of the mirror base 100 to a front surface of the phone holder 200 while surrounding a periphery of the mirror 130 and various function buttons 121, 122, and 123 are provided at a lower end of the mirror bezel 120.

For example, as the function buttons 121, 122, and 123, a function button 121 transmitting an on/off signal for bringing up a black screen on a screen of a mobile phone 400 to the controller 110, a function button 122 transmitting a signal for turning on/off a predetermined application [(for example, ADAS application (state-of-the-art driver support system application)] of the mobile phone 400, and a function button 123 transmitting a signal for turning on/off actuation (path rediscovery) of a navigation application of the mobile phone 400 to the controller 110 may be provided and a signal generated when a selected function button is actuated is transmitted to the mobile phone 400 through the controller 110.

In certain embodiments, each function button 121, 122, or 123 is connected with the controller 110 to transmit the signal in a wired method and the mobile phone 400 and the controller 110 are connected with each other to transmit the signal in a wireless method.

Figure 3:
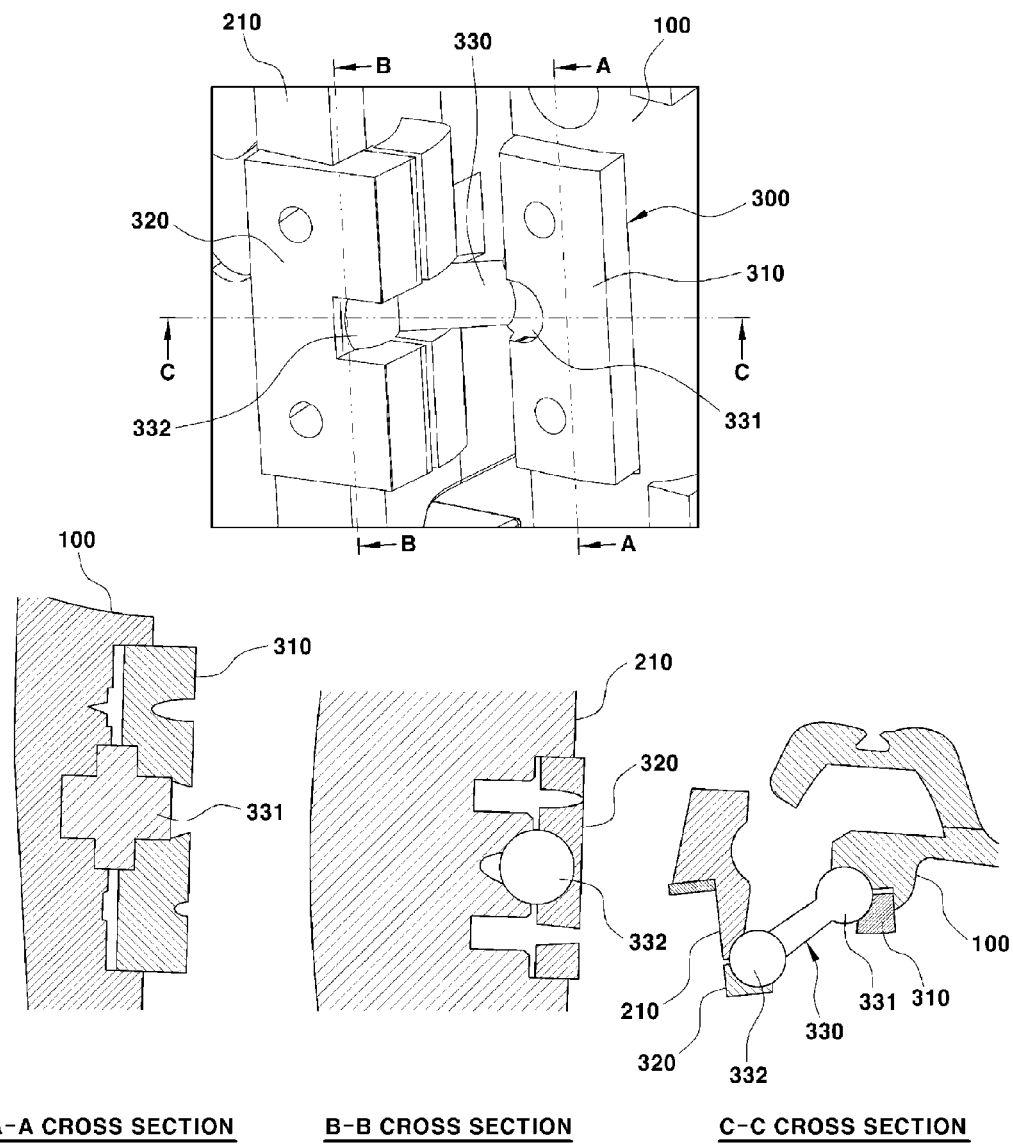
FIG. 3 is a diagram illustrating a connection structure between a mirror base and a phone holder of the mobile phone docking device according to the exemplary embodiment of the present invention.

Referring to FIGS. 1 to 3, in certain embodiments, the joint unit 300 is configured to include a hinge housing 310 joined to one side of the mirror base 100, a ball housing 320 joined to one side of the phone holder 200 [in detail, a holder base 210 of the phone holder 200], and a connecting rod 330 connected between the hinge housing 310 and the ball housing 320.

In certain embodiments, the connecting rod 330 includes a hinge 331 connected to the hinge housing 310 side and a ball unit 332 connected to the ball housing 320 side at both ends thereof.

In certain embodiments, the hinge 331 is inserted between the hinge housing 310 and the mirror base 100 to be axially rotatable and the ball unit 332 is inserted between the ball housing 320 and the phone holder 200 to be rotatable.

In certain embodiments, the hinge 331 is assembled between the hinge housing 310 and the mirror base 100 to be rotatable only in an axial rotation direction with 1 degree of freedom and the ball unit 332 is assembled between the ball housing 320 and the phone holder 200 to be rotatable omnidirectionally with 3 degrees of freedom.

As a result, in certain embodiments, an angle of the phone holder 200 is controllable independently apart from the mirror base 100 attached to the top of a vehicle body or a wind shield glass to constantly secure a camera image angle of the mobile phone 400 held in the phone holder 200.

For example, at the time of controlling a rotational angle of the mirror base 100 in order to control an angle of the inside mirror depending on the position of a driver's eye, the rotational angle of the phone holder 200 may be changed and controlled apart (independently) from the mirror base 100, and as a result, the camera of the mobile phone may continuously face the front of the vehicle.

Further, in certain embodiments, a penetration area 131 having predetermined penetration rate is formed at one side of the mirror 130 facing the phone holder 200, and as a result, the screen of the mobile phone 400 seated on the phone holder 200 may be visually verified through the penetration area 131 of the mirror 130.

In this case, in certain embodiments, the mobile phone 400 seated on the phone holder 200 displays only information which needs to be verified, such as an item previously set by the incorporated application, for example, a warning message for notifying a risk situation and turn-by-turn information of navigation, telephone and message information even while driving to be viewed to the driver through the penetration area 131 and items which need not be verified while driving and becomes an interference in driving, such as a motion picture, such as a motion picture, and the like may not be displayed.

In certain embodiments, when the screen of the mobile phone 400 becomes a black screen state, the penetration area 131 also serves to provide a rear view to a user similarly to other areas (areas other than the penetration area 131) of the mirror 130.

Herein, in certain embodiments, as a predetermined area (penetration area) at one side of left and right sides, a mirror member having predetermined penetration rate is used and the penetration area 131 is disposed to face the phone holder 200.

In certain embodiments, a jack withdrawal hole 211 capable of withdrawing a charging jack (roll type charging jack) for charging the mobile phone 400 is formed at one side of the holder base 210, and as a result, the mobile phone may be charged while the mobile phone is held on the phone holder 200.

Figure 4:
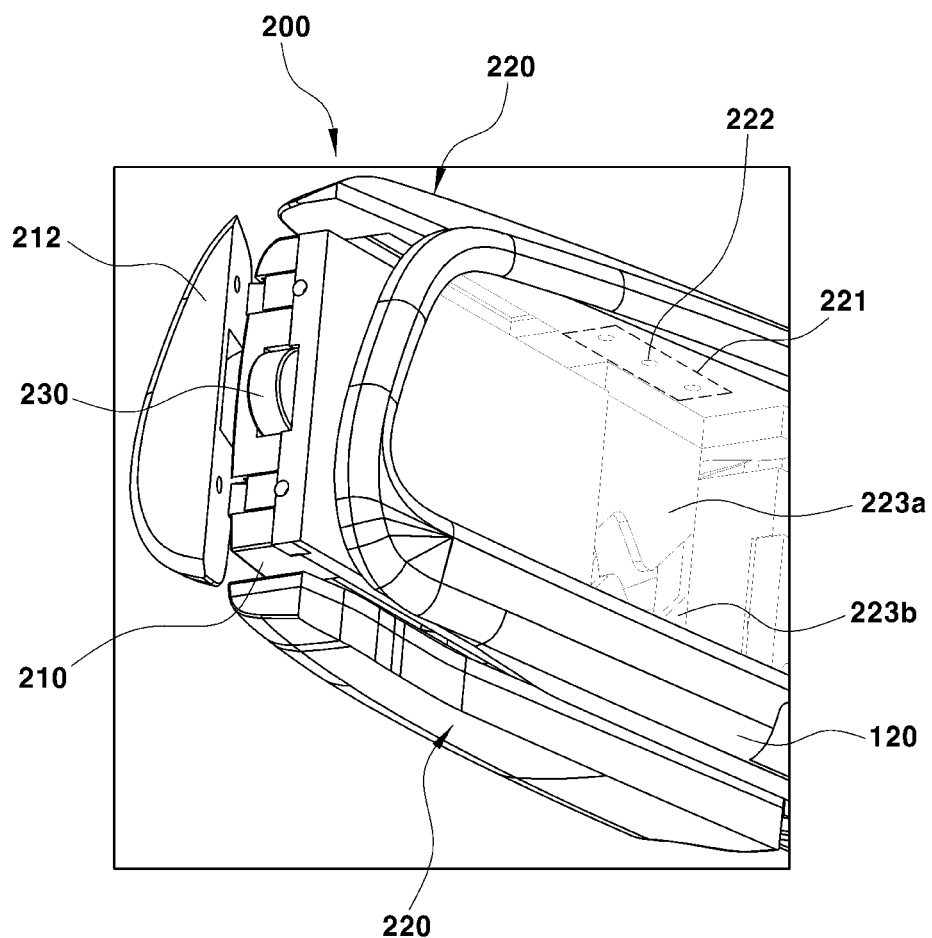
FIG. 4 is a perspective view illustrating the phone holder of the mobile phone docking device of the inside mirror according to the exemplary embodiment of the present invention.

In certain embodiments, the phone holder 200 includes a structure for holding the mobile phone and a structure for holding the mobile phone and as illustrated in FIGS. 1 and 2, and FIG. 4, the phone holder 200 is configured to include the holder base 210 and the phone gripper 220 mounted and joined onto the holder base 210.

In certain embodiments, the holder base 210 as a part that supports a rear surface of the mobile phone is connected with the mirror base 100 through the joint unit 300 to be pivotable to the mirror base 100 and a push button 230 is assembled to a button hole 218 at one end to protrude so that the user pushes and actuates (presses) the push button 230.

In addition, the phone gripper 220 that is opened and extended to both vertical both sides of the holder base 210 by interlocking with the actuation of the push button 230 is mounted on both vertical both sides of the holder base 210 to be linearly elevatable.

In certain embodiments, the phone gripper 220 is constituted by an upper gripper portion 220a assembled to an upper side of the holder base 210 and a lower gripper portion 220b assembled to a lower side of the holder base 210 and a first linear gear unit 225 and a second linear gear unit 226 that linearly move at opposite directions to each other by interworking with the actuation of the push button 230 protrude on a bottom surface of the upper gripper portion 220a and a top surface of the lower gripper portion 220b, respectively.

Figure 7:
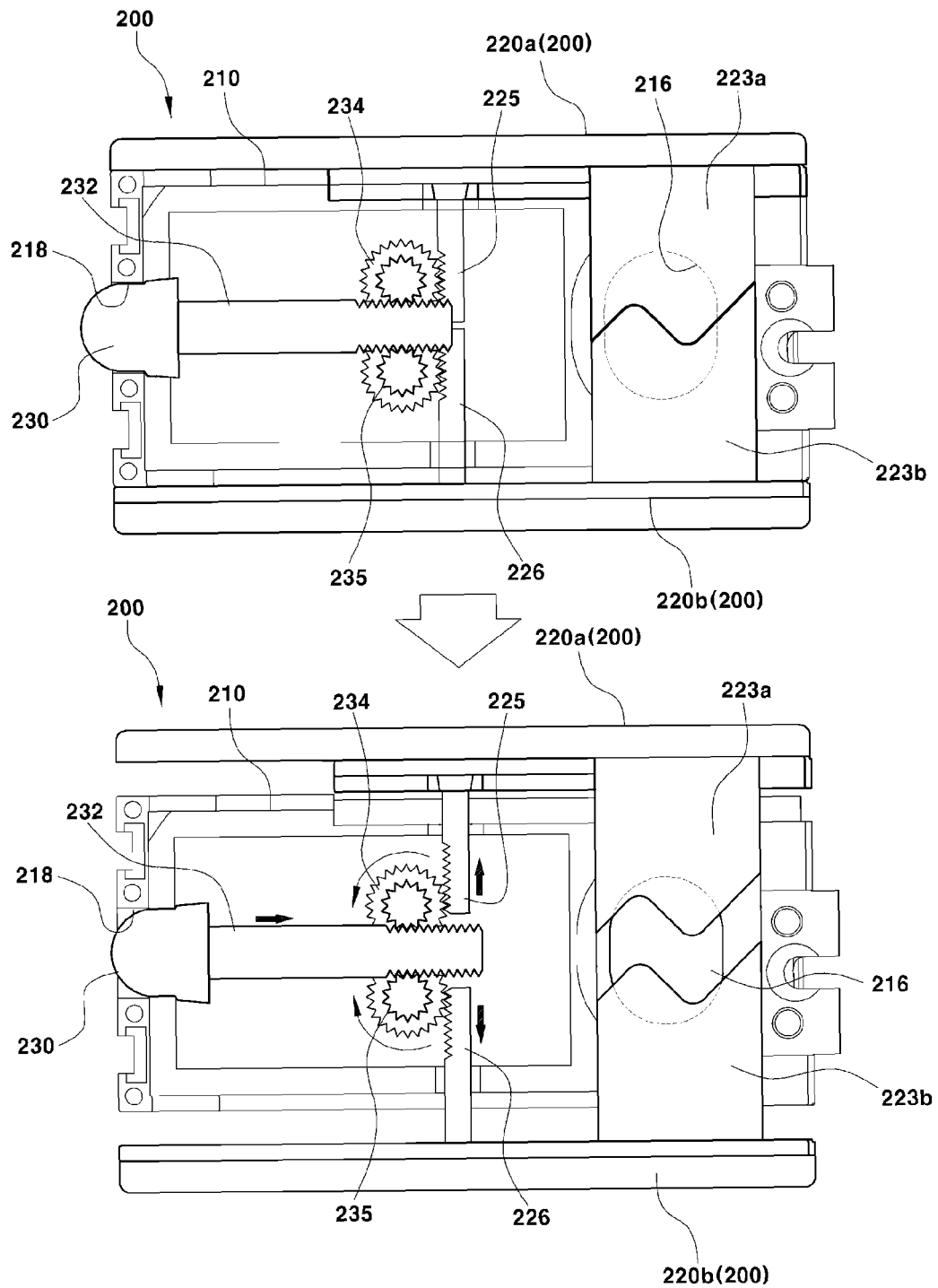
FIG. 7 is a diagram illustrating an interlocking structure between a push button of the phone holder and a phone gripper in the mobile phone docking device according to the exemplary embodiment of the present invention.

In certain embodiments, in the push button 230, a push gear unit 232 is formed at one side (a rear end) inserted into the button hole 218 of the holder base 210, a first rotational gear unit 234 and a second rotational gear unit 235 that rotate in engagement with the push gear unit 232 are assembled and incorporated into the holder base 210 to be rotatable in both directions, respectively, and further, the first linear gear unit 225 of the upper griping unit 220a engages with the first rotational gear unit 234 to be linearly movable and the second linear gripper 226 of the lower gripper 220b engages with the second rotational gear unit 235 to be linearly movable (see FIG. 7).

In certain embodiments, the phone holder 200 is configured to include the push button mounted on one side of the holder base 210 supporting the rear surface of the mobile phone, the first rotational gear unit 234 and the second rotational gear unit 235 that rotate in opposite directions to each other by interlocking with the linear movement of the push gear unit 232 attached to the rear end of the push button 230, the first linear gear unit 225 that protrudes on the bottom surface of the upper gripper portion 220a and linear moves to one upper or lower side by interlocking with the linear movement of the first rotational gear unit 234, and the second linear gear unit 226 that protrudes on the top surface of the lower gripper portion 220b and linearly moves in an opposite direction to the first linear gear unit 225 by interlocking with the second rotational gear unit 235, and the phone gripper 220 is movable to both upper and lower sides of the holder base 210 by interlocking with the operation of the push button 230.

As a result, in certain embodiments, when the user presses the push button 230, the upper gripper portion 220a and the lower gripper portion 220b move to both upper and lower sides of the holder base 210, respectively, and as a result, the phone gripper 220 is opened and in this case, when the holder base 210 pivots to the rear side of the mirror 130, since a space is formed inside the phone holder 200 to fit the mobile phone, the mobile phone fits between the upper gripper portion 220a and the lower gripper portion 220b and the upper gripper portion 220a and the lower gripper portion 220b are manually pressed to be closely attached to the side of the mobile phone, thereby holding and supporting (alternatively, fixing) the mobile phone.

Since a gap between the upper gripper portion 220a and the lower gripper portion 220b increases or decreases according to the width of the mobile phone, the phone gripper 220 may hold and fix the mobile phones having different widths and various sizes to the phone gripper 200.

Further, in certain embodiments, an iris 223 is formed in the phone gripper 220, which is positioned on a front surface of a camera hole 216 at one side (between a portion to which a ball housing 320 is attached and a portion to which the rotational gear units 234 and 235 are assembled) of the holder base 210 to open and close the camera hole 216.

In certain embodiments, the iris 223 is constituted by an upper iris 223a that protrudes on the bottom surface of the upper gripper portion 220a and a lower iris 223b that protrudes on the bottom surface of the lower gripper portion 220b, and when the phone gripper 220 is opened to both upper and lower sides, the upper iris 223a and the lower iris 223b are opened to both upper and lower sides, and as a result, the camera hole 216 which is closed and camera photographing of the mobile phone is enabled through the opened camera hole 216 (see FIG. 7).

Further, in certain embodiments, in the phone gripper 220, a magnetic field generation member 221 such as a magnet is embedded in the upper gripper portion 220a (alternatively, at least one of the upper gripper portion 220a and the lower gripper portion 220b) and a magnetic hole 222 is formed on an inner wall surface of the upper gripper portion 220a for smooth dispersion of a magnetic field emitted from the magnetic field generation member 221.

In certain embodiments, a side cover 212 serving as a housing of the push button 230 is pivotably hinge-coupled to one end of the holder base 210 and the side cover 212 pivots by the user to cover or expose the push button 230.

Figure 10:
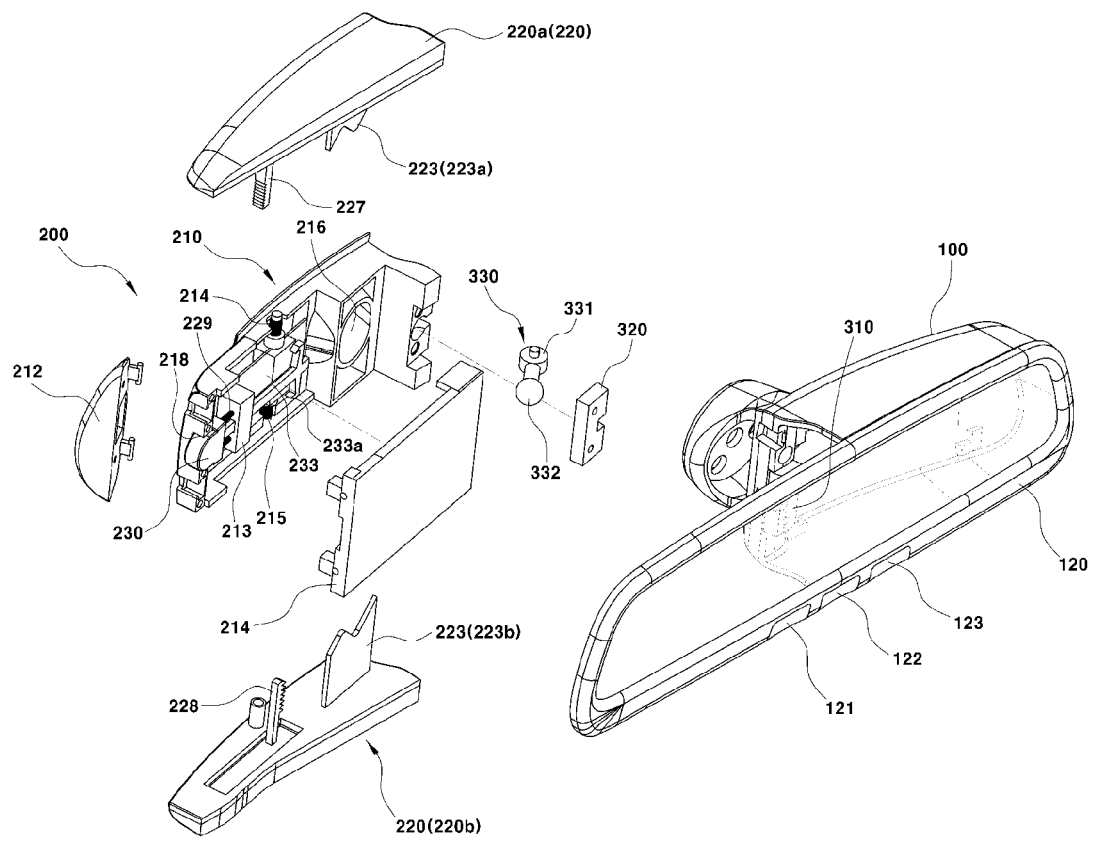
FIG. 10 is an exploded perspective view illustrating a mobile phone docking device of an inside mirror according to another exemplary embodiment of the present invention.
Figure 11:
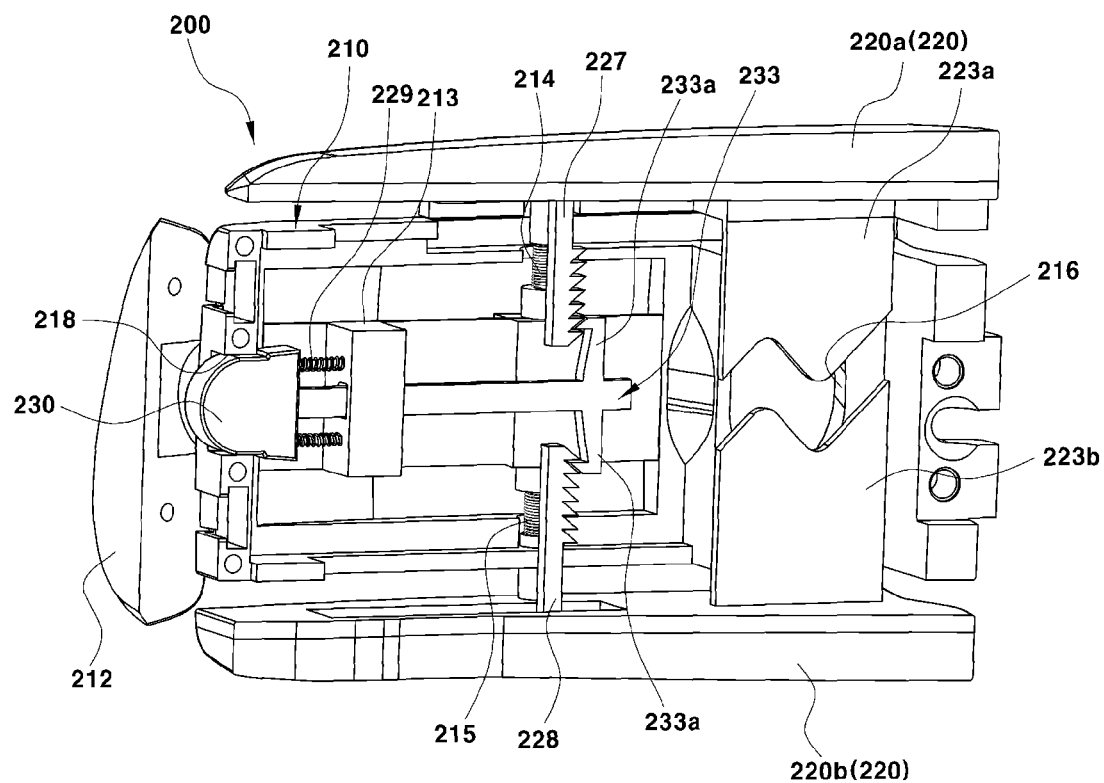
FIG. 11 is a perspective view illustrating a phone holder of the mobile phone docking device of the inside mirror according to another exemplary embodiment of the present invention.
Figure 12:
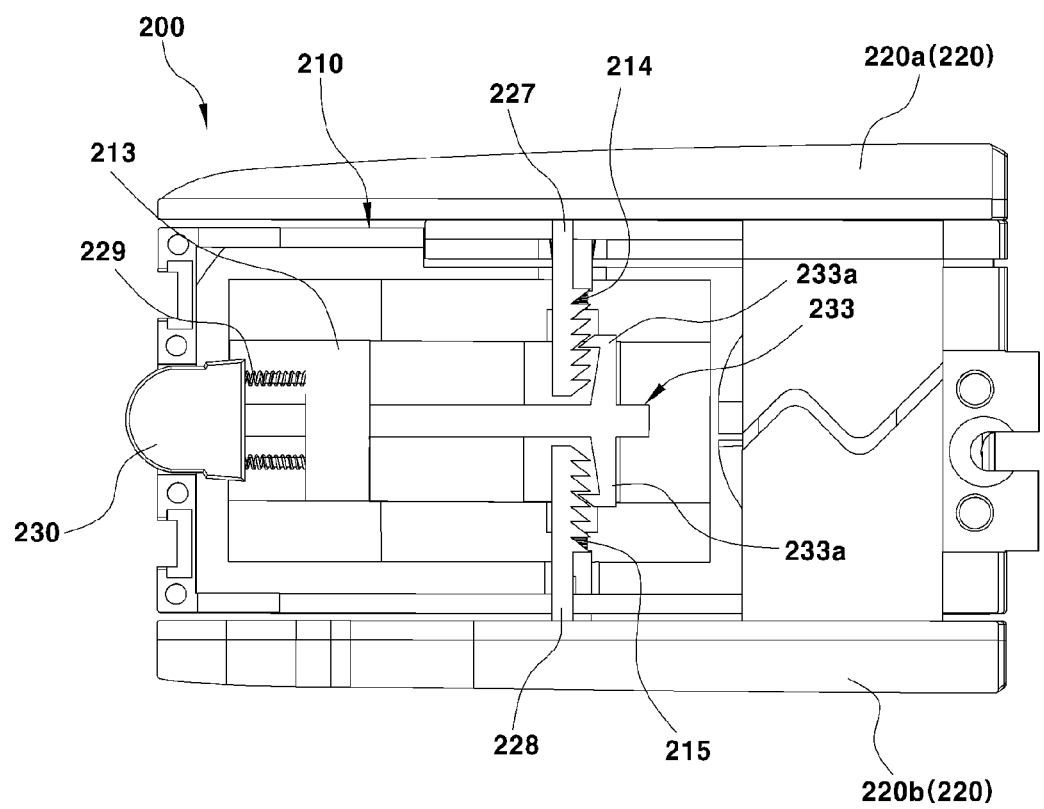
FIGS. 12 to 14 are diagrams illustrating an interlocking structure between a push button of the phone holder and a phone gripper in the mobile phone docking device according to another exemplary embodiment of the present invention.
Figure 13:
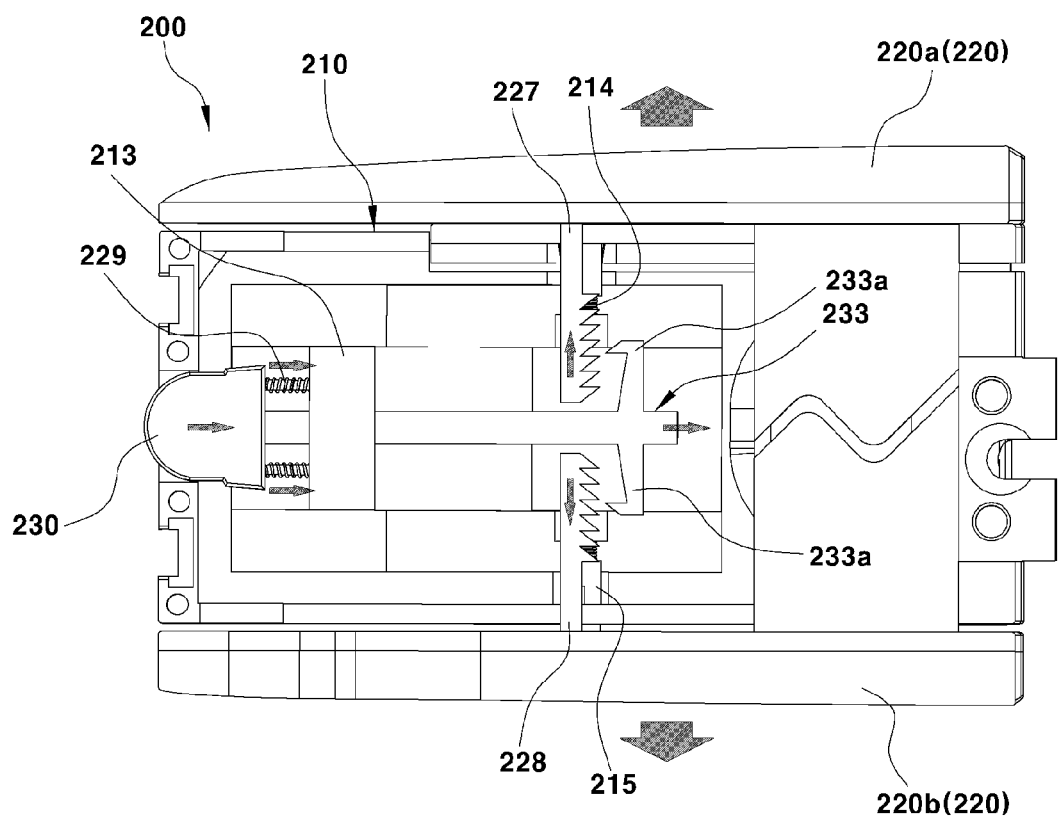
Figure 14:
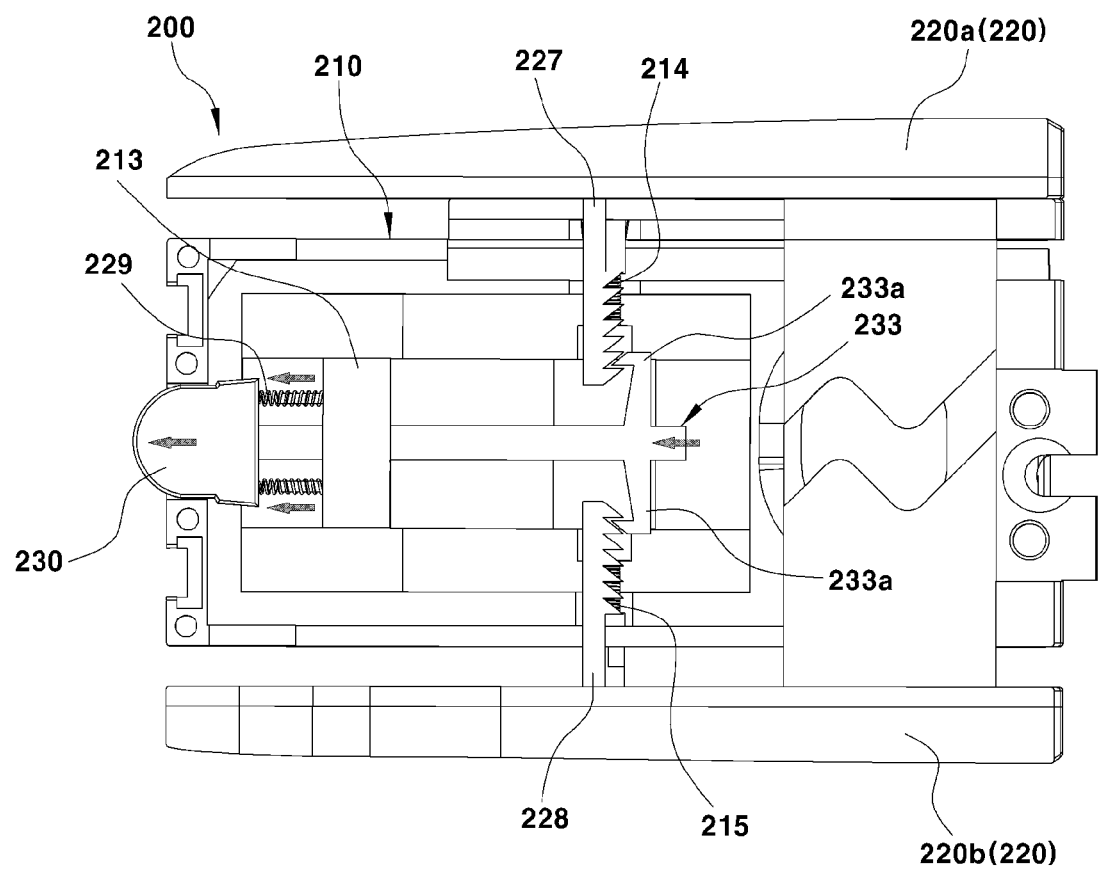

Meanwhile, FIG. 10 is an exploded perspective view illustrating a mobile phone docking device of an inside mirror according to another exemplary embodiment of the present invention. FIG. 11 is a perspective view illustrating a phone holder of the mobile phone docking device of the inside mirror according to another exemplary embodiment of the present invention. FIGS. 12 to 14 are diagrams illustrating an interlocking structure between a push button of the phone holder and a phone gripper in the mobile phone docking device according to another exemplary embodiment of the present invention.

The phone holder according to another exemplary embodiment of the present invention is described with reference to FIGS. 10 to 14, however, in this case, description of the same structure and configuration as the terminal holder according to the exemplary embodiment described above may be duplicated or omitted.

As illustrated in FIGS. 10 and 11, the phone holder 200 is configured to include a holder base 210 and a phone gripper 220 mounted and coupled onto the holder base 210.

The push button 230 is assembled to protrude from the button hole 218 at one end of the holder base 210 for activation by user's push. The phone gripper 220 is constituted by an upper gripper portion 220a assembled to an upper side of the holder base 210 and a lower gripper portion 220b assembled to a lower side of the holder base 210 and a first linear gear unit 227 and a second linear gear unit 228 that linearly move at opposite directions (extension and restoration directions of the phone gripper) to each other by interworking with the actuation of the push button 230 protrude on a bottom surface of the upper gripper portion 220a and a top surface of the lower gripper portion 220b, respectively.

In certain embodiments, each of the first and second linear gear units 227 and 228 has a gear teeth at one end facing an inner side of the holder base 210.

In certain embodiments, a latch unit 233 is provided at one side (rear end) of the push button 230 and the latch unit 233 has a locking unit 223a that extends to both upper and lower sides (that is, the extension direction of the phone gripper) to lock and unlock the first and second linear gear units 227 and 228. The locking unit 233a prevents the linear gear units 227 and 228 from being suspended on the gear teeth of the first and second linear gear units 227 and 228 and moving to upper sides and lower sides of the linear gear units 227 and 228.

In certain embodiments, the latch unit 233 serves to lock extension (opening) of the phone gripper 220 to prevent the phone gripper 220 from being opened to both upper and lower sides of the holder base 210 when the push button 230 is not actuated and unlock extension (opening) of the phone gripper 220 to allow the phone gripper 220 from being opened to both upper and lower sides of the holder base 210 when the push button 230 is actuated.

Further, in certain embodiments, a return spring 229 supported between the push button 230 and a spring support 213 is mounted on one side of the push button 230 and the spring support 213 is provided to be embedded in the holder base 210.

As illustrated in FIGS. 12 to 14, the return spring 229 generates elastic restoration force while being compressed when the phone gripper 220 extends to both upper and lower sides by actuating the push button 230 and thereafter, restores the push button 230 by the elastic restoration force.

Further, in certain embodiments, an extension means that extends (opens) the phone gripper 220 to both upper and lower sides of the holder base 210 at the time of unlocking the first and second linear gear units 227 and 228 is mounted between the holder base 210 and the phone gripper 220. In certain embodiments, the extension means includes first and second extension springs 214 and 215.

In certain embodiments, the first extension spring 214 is mounted between the holder base 210 and the upper gripper portion 220a in a compression state and the second extension spring 215 is mounted between the holder base 210 and the lower gripper portion 220b in the compression state, and as a result, the phone gripper 220 is extended and opened to both upper and lower sides (in the extension direction of the phone holder) by the elastic restoration force of the first and second extension springs 214 and 215 at the time of unlocking the first and second linear gear units 227 and 228.

In other words, in the phone holder 200, the latch unit 233 provided at the rear end of the push button 230 unlocks the first linear gear unit 227 of the upper gripper 220a and the second linear gear unit 228 of the lower gripper 220b by actuating the push button 230 mounted at one side of the holder base 210 and in this case, while the first extension spring 214 compressed between the holder base 210 and the upper gripper portion 220a and the second extension spring 215 compressed between the holder base 210 and the lower gripper portion 220b are restored, the first linear gripper 227 moves upward and the second linear gear unit 228 moves downward, and as a result, the phone gripper 220 is configured to be opened to both sides (in the extension direction) of the holder base 210.

In certain embodiments, when the mobile phone is held on the phone holder 200 and thereafter, the phone gripper 220 is pressed from both sides with hands, the phone gripper 220 is fixed to a position to closely contact the mobile phone by the first and second linear gear units 227 and 228 and the latch unit 233.

Herein, a processing of docking the mobile phone on the mobile phone docking device configured as above will be described below with reference to FIGS. 5 and 6.

Figure 5A:
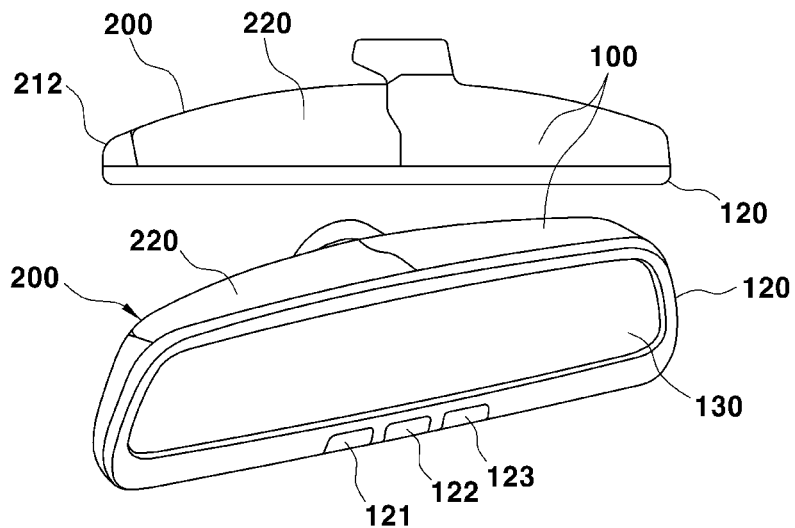
FIGS. 5A-B and 6A-B are diagrams illustrating an operation process for holding a mobile phone in a phone holder of a mobile phone docking device according to exemplary embodiments of the present invention.
Figure 5B:
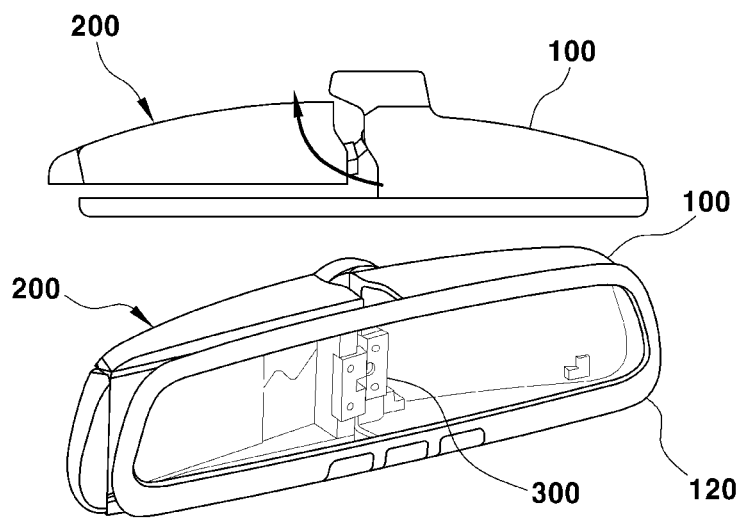

First, as illustrated in FIGS. 5A and 5B, in certain embodiments, a space for inserting the mobile phone 400 is provided between the phone holder 200 and the mirror bezel 120 by rotating the phone holder 200 in a clockwise direction based on the mirror base 100.

Figure 6A:
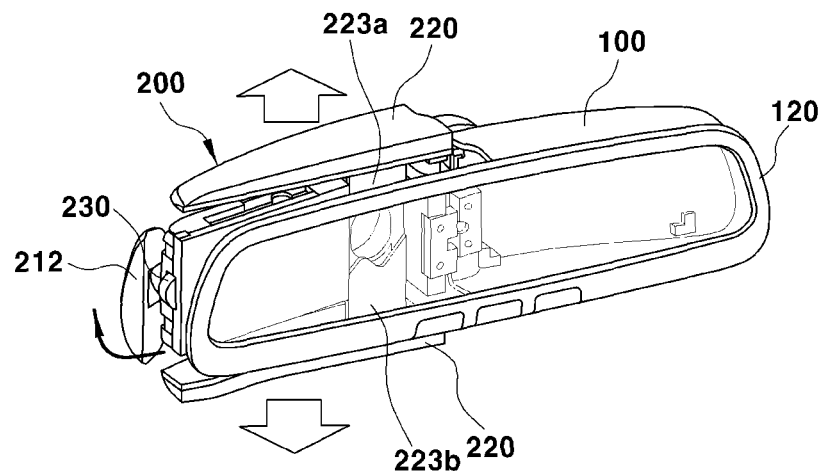
Figure 6B:
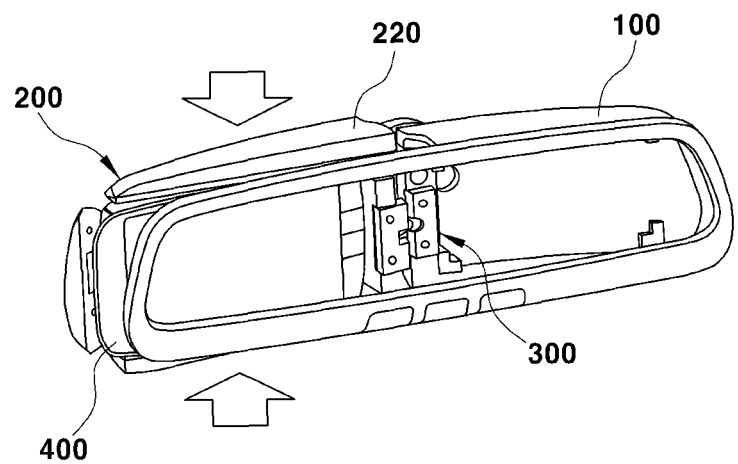

Next, in certain embodiments, as illustrated in FIGS. 6A and 6B, the phone gripper 220 moves to both upper and lower sides of the holder base 210 by pivoting and bending back the side cover 212 and pressing the push button 230 and thereafter, the mobile phone 400 is inserted into the phone holder 200 (that is, between the upper gripper portion 220a and the lower gripper portion 220b of the phone gripper 220) and the phone gripper 220 is pressed from both upper and lower sides to closely contact both surfaces of the mobile phone 400.

In this case, the phone gripper 220 is fixed while closely contacting both surfaces of the mobile phone 400 to support the mobile phone 400 to be prevented from moving to both upper and lower sides.

Although not illustrated, in certain embodiments, the mobile phone 400 closely contacts the mirror bezel 120 by pivoting the phone holder 200 to the mirror bezel 120 in order to prevent in order to prevent the mobile phone 400 from being separated between the phone holder 200 and the mirror bezel 120, the mobile phone 400 and the mirror bezel 120 close contact each other by pivoting the phone holder 200 to the mirror bezel 120

Figure 8:
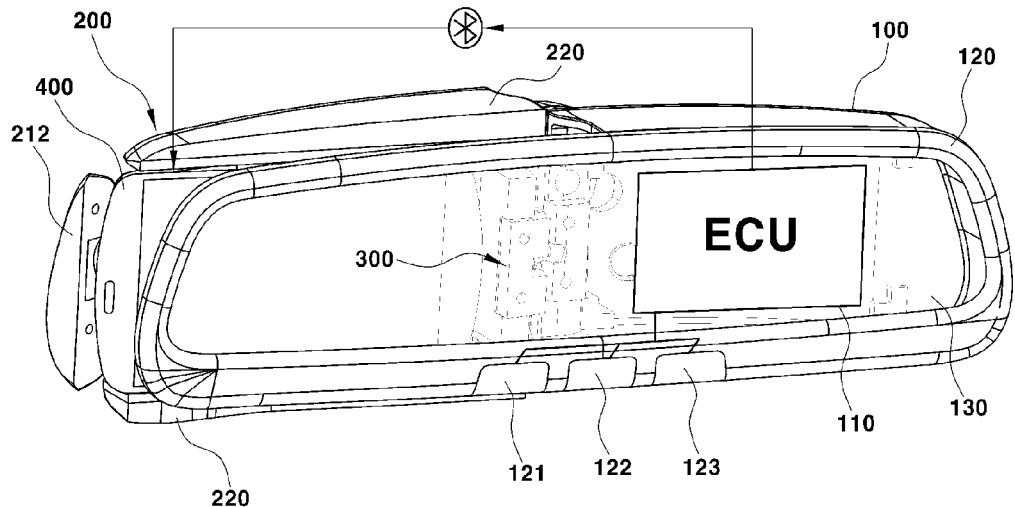
FIG. 8 is a diagram illustrating an application execution method of the mobile phone held in the phone holder of the mobile phone docking device according to the exemplary embodiment of the present invention.

Referring to FIG. 8, in certain embodiments, the mobile phone 400 seated on the phone holder 200 is connected with the controller 110 embedded in the mirror base 100 and the controller 110 is connected with the respective function buttons 121, 122, and 123 provided in the mirror bezel 120 in a wired method.

In this case, in certain embodiments, the mobile phone 400 receives a signal of the controller 110 through wireless communication such as Bluetooth, and the like.

In certain embodiments, in the mobile phone held on the phone holder 200 as an intelligent terminal in which a magnetic field measuring means (not illustrated) such as a hall sensor is basically embedded, such as a smart phone, and the like, a magnetic field detection application is, in advance, installed, which is executed by a signal measured by the magnetic field measuring means and a predetermined application is, in advance, installed, which is designed to be automatically executable by the magnetic field detection application.

For example, in this case, examples of the predetermined application include an advanced driver assistance system (ADAS) application that may implement a lane departure warning system (LDWS) or a front collision warning (FCW) system function required by the user, and the like.

Figure 9:
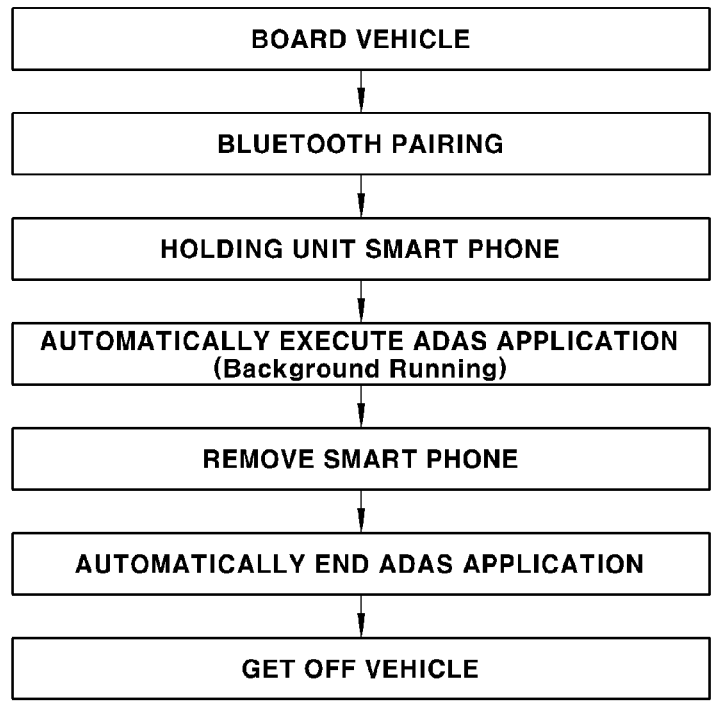
FIG. 9 is a diagram illustrating a process in which an application of the mobile phone held in the phone holder of the mobile phone docking device according to the exemplary embodiment of the present invention is executed.

Referring to FIG. 9, in certain embodiments, when the user boards a vehicle with the mobile phone 400, and as a result, the controller 110 of the mirror base 100 and the mobile phone 400 coexist within a predetermined space (predetermined distance), the controller 110 and the mobile phone 400 are paired by Bluetooth (wireless transmission scheme), a result of measuring the magnetic field emitted from the magnetic field generation member (magnet) 221 embedded in the phone gripper 220 of the phone holder 200 by the magnetic field measuring means embedded in the mobile phone 400 is transmitted to the magnetic field detection application of the mobile phone 400, and the magnetic field detection application automatically executes the predetermined application (ADAS application) of the mobile phone 400 which is selected in advance (set in advance) on a background when a measurement value of the magnetic field measuring means is detected as a magnetic field having a predetermined value or more, which is set in advance.

Herein, in certain embodiments, when a distance between the magnetic field measuring means (not illustrated) and the magnetic field generation member 221 is narrowed within a predetermined distance, for example, when the mobile phone 400 is held on the phone holder 200, a predetermined magnetic field or more is detected.

In certain embodiments, when the magnetic field measuring means detects the magnetic field which is less than a predetermined value which is set in advance while the predetermined application (ADAS application) of the mobile phone 400 is being executed, for example, in the case where the mobile phone 400 is removed from the phone holder 200, the execution of the predetermined application (ADAS application) automatically ends by the magnetic field detection application.

In other words, in certain embodiments, the magnetic field detection application of the mobile phone 400 receives a sensing value of the magnetic field measuring means in real time even while the predetermined application (ADAS application) which is set in advance is executed, and as a result, when the sensing value of the magnetic field measuring means is less than a predetermined value which is set in advance, the ADAS application automatically ends.

In addition, in certain embodiments, as mentioned as above, various function buttons (switch members) 121, 122, and 123 are provided in the mirror base 100 while being connected with the controller 110 in the wired method below the mirror bezel 120 and when any one of the function buttons 121, 122, and 123 is pressed and actuated, an actuation signal of the actuated function button is transmitted to the mobile phone 400 through the controller 110.

In certain embodiments, the mobile phone 400 that receives the signal of the function button which is on/off-actuated through the controller 110 is controlled according to the signal, and as a result, the application corresponding to the actuated function button is executed or ends.

That is, in certain embodiments, in the mobile phone, when the function button is on/off-actuated, the predetermined application corresponding to the function button is executed and the corresponding application performs an actuation such as on/off (alternatively, route re-search/re-search cancellation), or the like.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A mobile phone docking device of an inside mirror capable of holding a mobile phone, the device comprising:
   a mirror base having a mirror formed on a front surface thereof;
   a phone holder including a holder base and a phone gripper configured to extend from two opposing sides of the holder base to grip the mobile phone, the holder base configured to hold and support the mobile phone gripped by the phone gripper; and
   a joint unit connecting the mirror base and the phone holder and configured to pivotably support the phone holder on the mirror base,
   wherein the phone holder is configured to hold the mobile phone at a rear side of the mirror.

2. The device of claim 1, wherein the phone holder includes a magnetic field generation member embedded at one side thereof, the magnetic field generation member capable of generating a magnetic field, and the mobile phone is configured to automatically execute a preset application upon detecting a magnetic field greater than or equal to a first reference value.

3. The device of claim 1, wherein the phone holder includes a magnetic field generation member embedded at one side thereof, the magnetic field generation member capable of generating a magnetic field, and the mobile phone is configured to automatically execute a preset application when the mobile phone is held in the phone holder.

4. The device of claim 2, wherein the mobile phone is configured to automatically end the preset application upon detecting, while executing the preset application, a magnetic field less than a second reference value.

5. The device of claim 3, wherein the mobile phone is configured to automatically end the preset application when the mobile phone is removed from the phone holder while the predetermined application is executed.

6. The device of claim 1, wherein a camera hole is formed at one side of the holder base, an iris for opening and closing the camera hole is formed in the phone gripper, and the iris is configured to open the camera hole when the phone gripper is opened and extends to both sides of the holder base and the mobile phone is thus inserted into the phone gripper.

7. The device of claim 1, wherein a penetration area having predetermined penetration rate is formed at one side of the mirror, and a screen of the mobile phone seated in the phone holder is able to be visually verified through the penetration area.

8. The device of claim 1, wherein a controller wirelessly connected with the mobile phone held in the phone holder is mounted inside the mirror base, and the controller is wiredly connected to a plurality of function buttons provided in a mirror bezel formed at an edge of the mirror to transmit an actuation signal of each of the function buttons to the mobile phone, thereby allowing the mobile phone receiving the signal to execute or end an application.

9. The device of claim 1, wherein:
   the joint unit includes a hinge housing coupled to one side of the mirror base, a ball housing coupled to one side of the holder base, and a connecting rod having opposing first and second ends, the first end having a hinge connected to the hinge housing and the second end having a ball unit connected to the ball housing, and
   the hinge is assembled between the hinge housing and the mirror base to be axially rotatable and the ball unit is assembled between the ball housing and the holder base to be rotatable in a front direction, and as a result, the phone holder is rotatable in the front direction while axially rotating based on the mirror base.

10. The device of claim 1, wherein in the phone holder, a push button is mounted at one side of the holder base supporting a rear surface of the mobile phone and the phone gripper is opened and extended to both sides of the holder base by interlocking with an operation of the push button.

11. The device of claim 1, wherein:
   the phone holder includes
   a push button mounted at one side of the holder base,
   a push gear unit attached to a rear end of the push button,
   first and second rotational gear units interlocked with the push gear unit and configured to rotate in opposite directions to each other due to linear movement of the push gear unit,
   a first linear gear unit protruding from a bottom surface of an upper gripper portion of the phone gripper, the first linear gear unit interlocked with the first rotational gear unit and configured to move linearly in an upper or lower direction due to movement of the first rotational gear unit,
   a second linear gear unit protruding from a top surface of a lower gripper portion of the phone gripper, the second linear gear unit interlocked with the second rotational gear unit and configured to move linearly in an opposite direction to the first linear gear unit due to movement of the second rotational gear unit, and
   wherein the phone gripper is opened to extend from both sides of the holder base by an operation of the push button.

12. The device of claim 1, wherein:
   the phone holder includes
   a push button mounted at one side of the holder base,
   a latch unit provided at a rear end of the push button, the latch unit configured to unlock an extension portion of the phone gripper so as to open the phone gripper to both sides of the holder base when the push button is actuated, and an extension means mounted between the holder base and the phone gripper to open the phone gripper to both sides of the holder base at the time of unlocking by the latch unit.

\* \* \* \* \*